UNITED STATES PATENT OFFICE.

CHARLES GLASER, OF BALTIMORE, MARYLAND.

PROCESS OF SEPARATING ALUMINA FROM PHOSPHATES.

SPECIFICATION forming part of Letters Patent No. 453,300, dated June 2, 1891.

Application filed January 30, 1891. Serial No. 379,617. (No specimens.)

*To all whom it may concern:*

Be it known that I, CHARLES GLASER, a citizen of the United States, residing at Baltimore, in the State of Maryland, have invented certain new and useful Improvements in the Process of Separation and Conversion of Alumina Phosphate; and I do hereby declare the following to be a full, clear, and exact description of the invention, such as will enable others skilled in the art to which it appertains to make and use the same.

This invention relates to a new and useful process by which phosphate of alumina can be removed from phosphatic material with the two results of, first, freeing said material from its presence, and, second, converting the removed phosphate of alumina to a condition answering the approved tests of availability for manurial purposes. Both or either of these useful results are obtained by the following process: The material containing phosphate of alumina is submitted in a finely-divided state to the solvent action of a sufficient solution of the carbonate of an alkali or the phosphate of an alkali. This solution, which I shall call the "solvent," must be applied with heat, and the material may be either digested in it or leached with it, taking care in the latter case to keep it heated. It will be found that all the phosphate of alumina present is dissolved. The solution so obtained at or near saturation is separated from the solid residue (which will be so freed from the phosphate of alumina) and is allowed to cool. It will then deposit the greater part of the phosphate of alumina as a precipitate, and this being separated by decantation, filtration, or otherwise will be found to be entirely soluble in the standard solution of citrate of ammonia at 150° Fahrenheit, so meeting the approved test of availability for manurial purposes. The liquid will now contain carbonate or phosphate of alkalies, with a remainder of phosphoric acid and a small amount of the phosphate of alumina, (corresponding to its decreased solvent power when cooled,) and may be used again as a solvent upon a new charge of material. The small amount of alumina phosphate left in solution will in a series of such operations be a permanent quantity and will not interfere with the recovery of all the rest of that compound.

The following example will show the best way known to me of carrying out my process. Take a convenient amount of phosphate of alumina or mineral containing same reduced to a finely-divided state. Put in a suitable vessel and boil with the solution of the carbonate of an alkali (or equivalent)— for example, sodium carbonate. This solution must be sufficient in amount to insure complete dissolving of the phosphate of alumina, but must not be so concentrated as to crystallize on cooling. In the example taken it may contain between ten and fifteen per cent. of sodium carbonate, by weight. By experiment I find that a hot solution containing ten pounds of sodium carbonate will rapidly dissolve one pound of phosphate of alumina and will dissolve more by prolonged boiling; but as it is intended to use the solvent repeatedly a small excess is of no consequence. The solvent once saturated with the amount of phosphate of alumina which it will hold at ordinary temperature (about one part of phosphate of alumina to forty of sodium carbonate) will give up at each cooling all the excess that it has taken up when heated. When the phosphate of alumina is all dissolved, separate the liquid solution. In the case of treating phosphate of alumina the residue will be chiefly silicates and impurities; but in treating phosphorites it will contain other phosphates freed from phosphate of alumina. The separated solution is now allowed to cool and the precipitated phosphate of alumina to settle. Sufficient time should be allowed for this, as the last portions of the precipitate form slowly. When completely settled, separate the precipitate from the liquid, preferably by the use of filtering-presses, wash and dry by a gentle heat. The liquid will then be available when heated as a solvent for a new operation.

From time to time it will be advisable to purify the solvent (as it accumulates organic or other impurities) by concentration, crystallization, and re-solution of its salts.

What I claim is—

The process of dissolving phosphate of alumina out of phosphatic material by the hot solution of a carbonate of an alkali, separating said phosphate of alumina as a precipitate from said solution by cooling, and using the remaining solution as a solvent for repetition of the operation, all substantially as described.

In testimony whereof I affix my signature in presence of two witnesses.

CHARLES GLASER.

Witnesses:
L. K. SPARROW,
A. TEEL.